United States Patent
Gozu (10) Patent No.: US 12,370,745 B2
(45) Date of Patent: Jul. 29, 2025

(54) THREE-DIMENSIONAL SHAPING DEVICE

(71) Applicant: SEIKO EPSON CORPORATION, Tokyo (JP)

(72) Inventor: Masayuki Gozu, Ina (JP)

(73) Assignee: SEIKO EPSON CORPORATION (JP)

( * ) Notice: Subject to any disclaimer, the term of this patent is extended or adjusted under 35 U.S.C. 154(b) by 227 days.

(21) Appl. No.: 18/159,909

(22) Filed: Jan. 26, 2023

(65) Prior Publication Data

US 2023/0234289 A1  Jul. 27, 2023

(30) Foreign Application Priority Data

Jan. 27, 2022  (JP) ................ 2022-010740

(51) Int. Cl.
| | |
|---|---|
| *B29C 64/35* | (2017.01) |
| *B29C 64/209* | (2017.01) |
| *B33Y 30/00* | (2015.01) |
| *B33Y 40/00* | (2020.01) |

(52) U.S. Cl.
CPC ............ *B29C 64/35* (2017.08); *B29C 64/209* (2017.08); *B33Y 30/00* (2014.12); *B33Y 40/00* (2014.12)

(58) Field of Classification Search
CPC ... B29C 64/393; B29C 64/112; B29C 64/118; B29C 64/35; B29C 64/209; B33Y 10/00; B33Y 30/00; B33Y 50/02; B33Y 40/00
See application file for complete search history.

(56) References Cited

U.S. PATENT DOCUMENTS

| | | | | |
|---|---|---|---|---|
| 4,015,645 | A | * | 4/1977 | Chamberlin .............. B65B 1/30 141/34 |
| 7,614,866 | B2 | * | 11/2009 | Sperry .................... B29C 64/35 425/185 |
| 2003/0234156 | A1 | * | 12/2003 | Schoeneck ............. B65G 47/29 198/419.1 |
| 2008/0317894 | A1 | | 12/2008 | Turley et al. |
| 2020/0198234 | A1 | * | 6/2020 | Kuster .................. B29C 64/393 |
| 2021/0197474 | A1 | * | 7/2021 | Alvarez ................. B33Y 30/00 |

FOREIGN PATENT DOCUMENTS

JP  2010-530326 A  9/2010

* cited by examiner

*Primary Examiner* — Galen H Hauth
*Assistant Examiner* — John Robitaille
(74) *Attorney, Agent, or Firm* — Harness, Dickey & Pierce, P.L.C.

(57) ABSTRACT

A three-dimensional shaping device includes: a dispensing unit having a nozzle and configured to dispense a material toward a stage; a cleaning mechanism configured to clean the nozzle; a moving unit configured to move the dispensing unit and the cleaning mechanism relative to the stage; and a control unit configured to control an operation of the moving unit. The cleaning mechanism includes a cleaning unit including a purge unit in which the material is purged from the nozzle and a brush unit to come into contact with the nozzle, and a recovery unit configured to recover the material accumulated in the purge unit. The control unit is configured to move the cleaning unit relative to the stage in conjunction with movement of the dispensing unit relative to the stage.

13 Claims, 8 Drawing Sheets

THREE-DIMENSIONAL SHAPING DEVICE

The present application is based on, and claims priority from JP Application Serial Number 2022-010740, filed Jan. 27, 2022, the disclosure of which is hereby incorporated by reference herein in its entirety.

BACKGROUND

1. Technical Field

The present disclosure relates to a three-dimensional shaping device.

2. Related Art

An example of a type of three-dimensional shaping device is described in JP-T-2010-530326. JP-T-2010-530326 describes a three-dimensional shaping device configured that an extrusion head is moved on a horizontal x-y plane, and the extrusion head is moved to an edge cleaning assembly to periodically clean the extrusion head by the edge cleaning assembly.

As described in JP-T-2010-530326, when cleaning is performed by moving the head to a cleaning mechanism, it is necessary to move the head over a long distance depending on a position of the head by which shaping is performed. Therefore, during the movement of the head, a residue in the head drops and adheres to a shaped object, which may affect shaping accuracy.

SUMMARY

In order to solve the above problems, a three-dimensional shaping device according to the present disclosure includes: a dispensing unit having a nozzle and configured to dispense a material toward a stage; a cleaning mechanism configured to clean the nozzle; a moving unit configured to move the dispensing unit and the cleaning mechanism relative to the stage; and a control unit configured to control an operation of the moving unit. The cleaning mechanism includes a cleaning unit including a purge unit in which the material is purged from the nozzle and a brush unit to come into contact with the nozzle, and a recovery unit configured to recover the material accumulated in the purge unit. The control unit is configured to move the cleaning unit relative to the stage in conjunction with movement of the dispensing unit relative to the stage.

DESCRIPTION OF EXEMPLARY EMBODIMENTS

Hereinafter, the present disclosure will be schematically described first.

In order to solve the above problems, a three-dimensional shaping device according to a first aspect of the present disclosure includes: a dispensing unit having a nozzle and configured to dispense a material toward a stage; a cleaning mechanism configured to clean the nozzle; a moving unit configured to move the dispensing unit and the cleaning mechanism relative to the stage; and a control unit configured to control an operation of the moving unit. The cleaning mechanism includes a cleaning unit including a purge unit in which the material is purged from the nozzle and a brush unit to come into contact with the nozzle, and a recovery unit configured to recover the material accumulated in the purge unit. The control unit is configured to move the cleaning unit relative to the stage in conjunction with movement of the dispensing unit relative to the stage.

According to the present aspect, the moving unit moves the cleaning unit relative to the stage in conjunction with the movement of the dispensing unit relative to the stage. Accordingly, when cleaning the nozzle, an access of the dispensing unit to the cleaning unit can be made shorter than that in a structure in which the conjunction is not performed.

In addition, the cleaning mechanism includes the cleaning unit and the recovery unit. Accordingly, the cleaning mechanism can be made compact.

The three-dimensional shaping device according to a second aspect of the present disclosure is directed to the first aspect and further includes: a cleaning moving unit configured to move the cleaning unit in a front-rear direction to clean the nozzle, in which the recovery unit is disposed on a front side in the front-rear direction.

According to the present aspect, the recovery unit is disposed on the front side in the front-rear direction, which is a moving direction during cleaning. Accordingly, it is easy to process the matter accumulated in the recovery unit when the recovery unit is full.

The three-dimensional shaping device according to a third aspect of the present disclosure is directed to the second aspect, in which the cleaning moving unit is configured to move the cleaning unit to a cleaning position in conjunction with movement of the dispensing unit to the cleaning position.

According to the present aspect, the cleaning moving unit moves the cleaning unit to the cleaning position. Accordingly, the structure is simpler than when only the dispensing unit is moved to the cleaning position. In addition, the control is also simplified.

In addition, when cleaning the nozzle, the cleaning unit is moved in conjunction with the movement of the dispensing unit to the cleaning position, and therefore, a time until the cleaning can be started at the cleaning position can be shortened as compared with that in the structure in which the conjunction is not performed.

The three-dimensional shaping device according to a fourth aspect of the present disclosure is directed to the first aspect, in which the purge unit has an openable and closable bottom surface, and the material accumulated in the purge unit falls into the recovery unit when the bottom surface is in an open state.

According to the present aspect, since the purge unit has the openable and closable bottom surface, the material accumulated in the purge unit can fall into the recovery unit with the bottom surface in the open state. Accordingly, the material accumulated in the purge unit can be transferred to the recovery unit using a simple structure.

The three-dimensional shaping device according to a fifth aspect of the present disclosure is directed to the fourth aspect, in which the bottom surface includes a slide member configured to slide, and when the purge unit moves to a recovery position where the material in the purge unit falls into the recovery unit, the slide member slides to bring the bottom surface into the open state.

According to the present aspect, when the purge unit moves to a recovery position where the material in the purge unit falls into the recovery unit, the slide member can automatically slide to bring the bottom surface into the open state. Accordingly, the material accumulated in the purge unit can be easily transferred to the recovery unit only by sliding the slide member.

The three-dimensional shaping device according to a sixth aspect of the present disclosure is directed to the first aspect, in which the recovery unit has an inclined surface inclined in a horizontal direction on an inner surface of the recovery unit.

According to the present aspect, since the recovery unit has the inclined surface inclined in the horizontal direction on the inner surface, an object dropped from the inside of the purge unit into the recovery unit is guided by the inclined surface and gradually accumulates from a low position. Accordingly, the object can be uniformly accumulated in the recovery unit.

The three-dimensional shaping device according to a seventh aspect of the present disclosure is directed to the first aspect, and further includes a heating unit configured to heat a shaping region of the stage, in which the heating unit is located above a position of a dispensing port of the nozzle and below the cleaning unit during shaping, and has a shape that covers the shaping region when viewed from a direction perpendicular to the stage, and the moving unit is configured to move the heating unit relative to the stage in conjunction with the movement of the dispensing unit relative to the stage.

When the material is dispensed toward a first layer formed in the shaping region to form a second layer, the heating unit is provided for the purpose of improving adhesion between the first layer and the second layer.

According to the present aspect, the moving unit moves the heating unit relative to the stage in conjunction with the movement of the dispensing unit relative to the stage. Accordingly, it is possible to maintain a state in which the adhesion between the layers made of the material formed in the shaping region is increased.

The three-dimensional shaping device according to an eighth aspect of the present disclosure is directed to the seventh aspect, in which the moving unit is configured to move the dispensing port of the nozzle to a position above the heating unit when the cleaning unit cleans the nozzle.

According to the present aspect, when performing the cleaning, the moving unit moves the dispensing port of the nozzle to a position above the heating unit. Accordingly, the cleaning unit can clean the nozzle.

The three-dimensional shaping device according to a ninth aspect of the present disclosure is directed to the first aspect, and further includes a detection unit configured to detect an amount of the material recovered by the recovery unit.

According to the present aspect, since the detection unit detects the amount of the material recovered by the recovery unit, it is possible to grasp an accumulation state of the material accumulated in the recovery unit, and thus it is possible to avoid overflow of the material accumulated in the recovery unit.

The three-dimensional shaping device according to a tenth aspect of the present disclosure is directed to the first aspect, in which the recovery unit is detachable, the three-dimensional shaping device further includes a detection unit configured to detect that the recovery unit is attached, the detection unit includes a light emitting unit, a light receiving unit located in an optical path of the light emitting unit, and an optical path opening and closing mechanism configured to open or block the optical path, and the detection unit is configured to detect that the recovery unit is attached by switching from one state, in which the optical path is opened or blocked, to the other state.

According to the present aspect, the detection unit includes the optical path opening and closing mechanism that switches between opening and closing of the optical path in a state in which the recovery unit is not attached and in a state in which the recovery unit is attached. With the optical path opening and closing mechanism, it is possible to distinguish between the state in which the recovery unit is not attached to an attachment position and the state in which the recovery unit is attached to the attachment position. Accordingly, it is possible to easily grasp whether the recovery unit is attached.

The three-dimensional shaping device according to an eleventh aspect of the present disclosure is directed to the first aspect, in which the dispensing unit includes a first dispensing unit and a second dispensing unit, and the cleaning unit is configured to, during shaping by one of the first dispensing unit and the second dispensing unit, clean a nozzle of the other one of the first dispensing unit and the second dispensing unit.

According to the present aspect, the dispensing unit includes the first dispensing unit and the second dispensing unit. Accordingly, the cleaning unit can, during shaping by one of the first dispensing unit and the second dispensing unit, clean a nozzle of the other one of the first dispensing unit and the second dispensing unit. Therefore, a dispensing operation of the material onto the stage for shaping and a cleaning operation of the nozzle can be efficiently performed.

The three-dimensional shaping device according to a twelfth aspect of the present disclosure is directed to the first aspect, in which the cleaning unit includes a first cleaning unit corresponding to the first dispensing unit, and a second cleaning unit corresponding to the second dispensing unit, and the recovery unit includes a first recovery unit corresponding to the first cleaning unit, and a second recovery unit corresponding to the second cleaning unit.

According to the present aspect, the cleaning mechanism includes the first cleaning unit corresponding to the first dispensing unit and the second cleaning unit corresponding to the second dispensing unit, and further includes the first recovery unit corresponding to the first cleaning unit and the second recovery unit corresponding to the second cleaning unit. Accordingly, the cleaning of the first dispensing unit and the recovery of the material from the first cleaning unit to the first recovery unit, and the cleaning of the second dispensing unit and the recovery of the material from the second cleaning unit to the second recovery unit can be performed separately, which is efficient.

The three-dimensional shaping device according to a thirteenth aspect of the present disclosure is directed to the twelfth aspect, in which the first recovery unit and the second recovery unit are disposed adjacent to each other in a horizontal direction, and the detection unit is configured to detect an amount of a material recovered by the first recovery unit and the second recovery unit by emitting light from a side surface of the first recovery unit and receiving light at a side surface of the second recovery unit.

According to the present aspect, the detection unit detects the amount of the material recovered by the first recovery unit and the second recovery unit by emitting light from the side surface of the first recovery unit and receiving light at the side surface of the second recovery unit disposed adjacent to the first recovery unit in the horizontal direction. Accordingly, the amount of the material accumulated in the first recovery unit and the second recovery unit can be grasped by one detection unit without using two detection units.

First Embodiment

Hereinafter, a three-dimensional shaping device according to a first embodiment will be specifically described with reference to FIGS. 1 to 8.

In the following description, three axes orthogonal to one another are defined as an X axis, a Y axis, and a Z axis, respectively, as shown in each drawing. A Z axis direction corresponds to a vertical direction, that is, a direction in which gravity acts. An X axis direction and a Y axis direction correspond to a horizontal direction. In each drawing, directions indicated by arrows of the three axes (X, Y, Z) are a +direction of each direction, and the opposite direction is a −direction.

Figure 1:
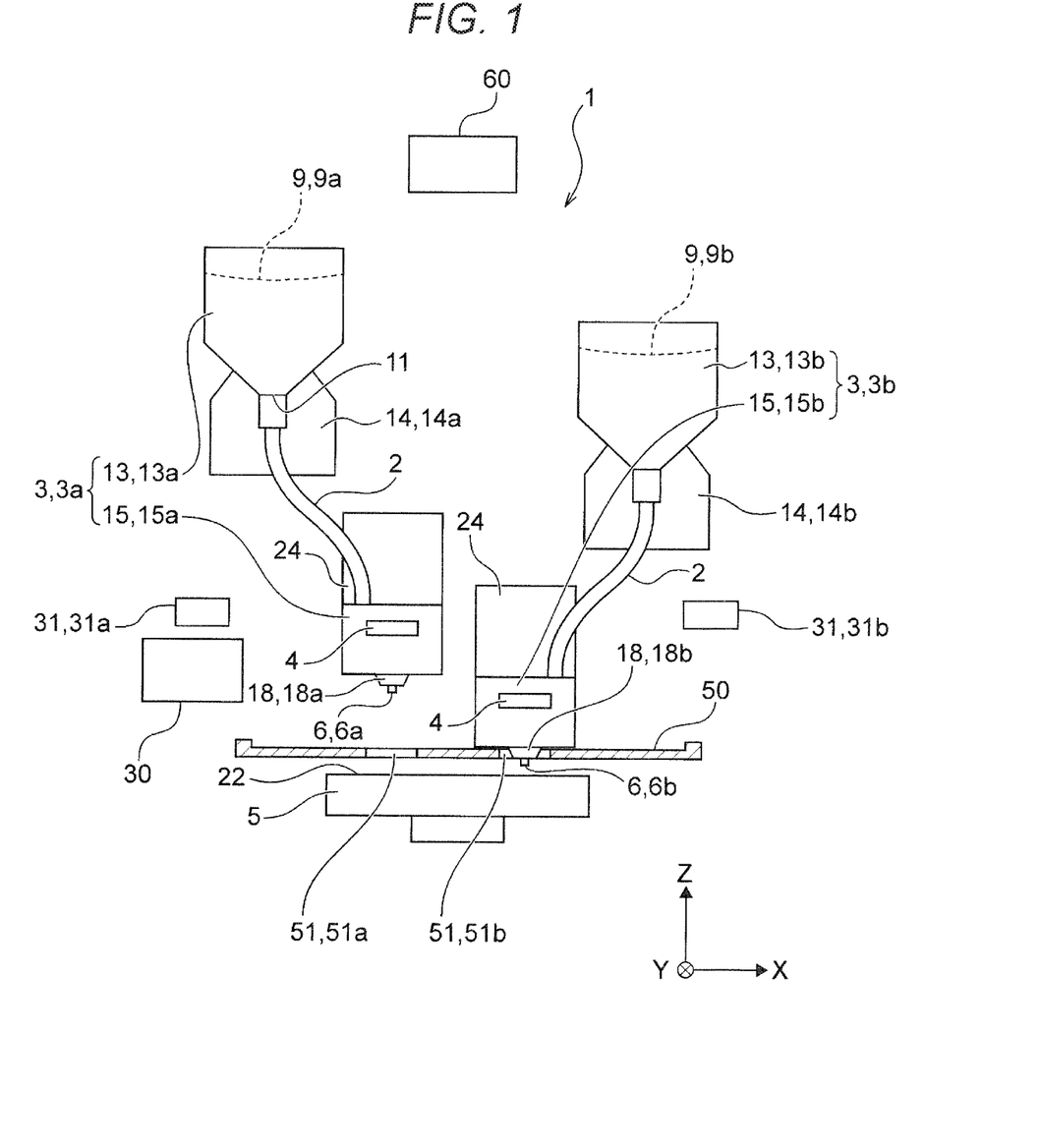
FIG. 1 is a schematic configuration diagram of a three-dimensional shaping device according to a first embodiment.

As shown in FIG. 1, a three-dimensional shaping device 1 according to the present embodiment roughly includes a material dispensing device 3 that dispenses a material 9 for shaping from a dispensing unit 15, and a stage 5 on which the material 9 dispensed from the material dispensing device 3 is stacked. The three-dimensional shaping device 1 further includes a control unit 60 that controls a stacking operation of the material 9 from the material dispensing device 3 to the stage 5.

Here, the material 9 is a filler-containing resin fluid as an example plasticized by a plasticizing unit 4 included in the material dispensing device 3. The term "dispense" is used in a meaning including both a case where the material 9 of the fluid is pushed out continuously in a string shape from an outlet and a case where the material is dispensed in a granular state.

In the present embodiment, the material dispensing device 3 includes a material storage unit 13 that stores the material 9 therein and has an outlet portion 11 at a lower portion thereof, and the dispensing unit 15 that dispenses the material 9 dispensed from the outlet portion 11 to the outside in a state in which at least a part of the material 9 is plasticized by the plasticizing unit 4.

The outlet portion 11 of the material storage unit 13 and the dispensing unit 15 are communicated with each other by a tube 2. The granular material 9 in the material storage unit 13 reaches the inside of the dispensing unit 15 through the tube 2. The material is plasticized by the plasticizing unit 4 in the dispensing unit 15 to become a fluid that can be dispensed, and the fluid is dispensed onto the stage 5 from a dispensing port 6 of the dispensing unit 15.

As shown in FIG. 1, in the present embodiment, the material dispensing device 3 includes two devices, that is, a first material dispensing device 3a and a second material dispensing device 3b. Here, a first dispensing unit 15a of the first material dispensing device 3a dispenses a material that finally becomes a structural material of a shaped object itself. A second dispensing unit 15b of the second material dispensing device 3b dispenses a support material.

When the second dispensing unit 15b is located at a shaping position and performs a dispensing operation, the first dispensing unit 15a is located away from the shaping position. When the first dispensing unit 15a is located at the shaping position and performs the dispensing operation, the second dispensing unit 15b is located away from the shaping position.

The second material dispensing device 3b is not limited to be the device that dispenses the support material, and may be a device that dispenses a material that finally becomes a structural material of the shaped object itself. Furthermore, the material dispensing device 3 may include a third material dispensing device. Furthermore, the material dispensing device 3 may not include the second material dispensing device 3b.

In the present embodiment, the first material dispensing device 3a and the second material dispensing device 3b have basically the same structure. In the following description, when the first material dispensing device 3a and the second material dispensing device 3b are distinguished from each other, "first" and "second" may be assigned to the head and alphabets a and b may be assigned to numeral signs of respective constituent members. When the first material dispensing device 3a and the second material dispensing device 3b do not need to be distinguished from each other, "first" and "second" may not be assigned to the head and the constituent members may be described without assigning a and b.

Furthermore, the other constituent member related to the first material dispensing device 3a and the other constituent member related to the second material dispensing device 3b are distinguished from each other, "first" and "second" may be assigned to the head and alphabets a and b may be assigned to numeral signs of respective constituent members. When both the other constituent members do not need to be distinguished from each other, "first" and "second" may not be assigned to the head and the other constituent members may be described without assigning a and b.

Hereinafter, the three-dimensional shaping device 1 according to the present embodiment will be described in detail.

Figure 2:
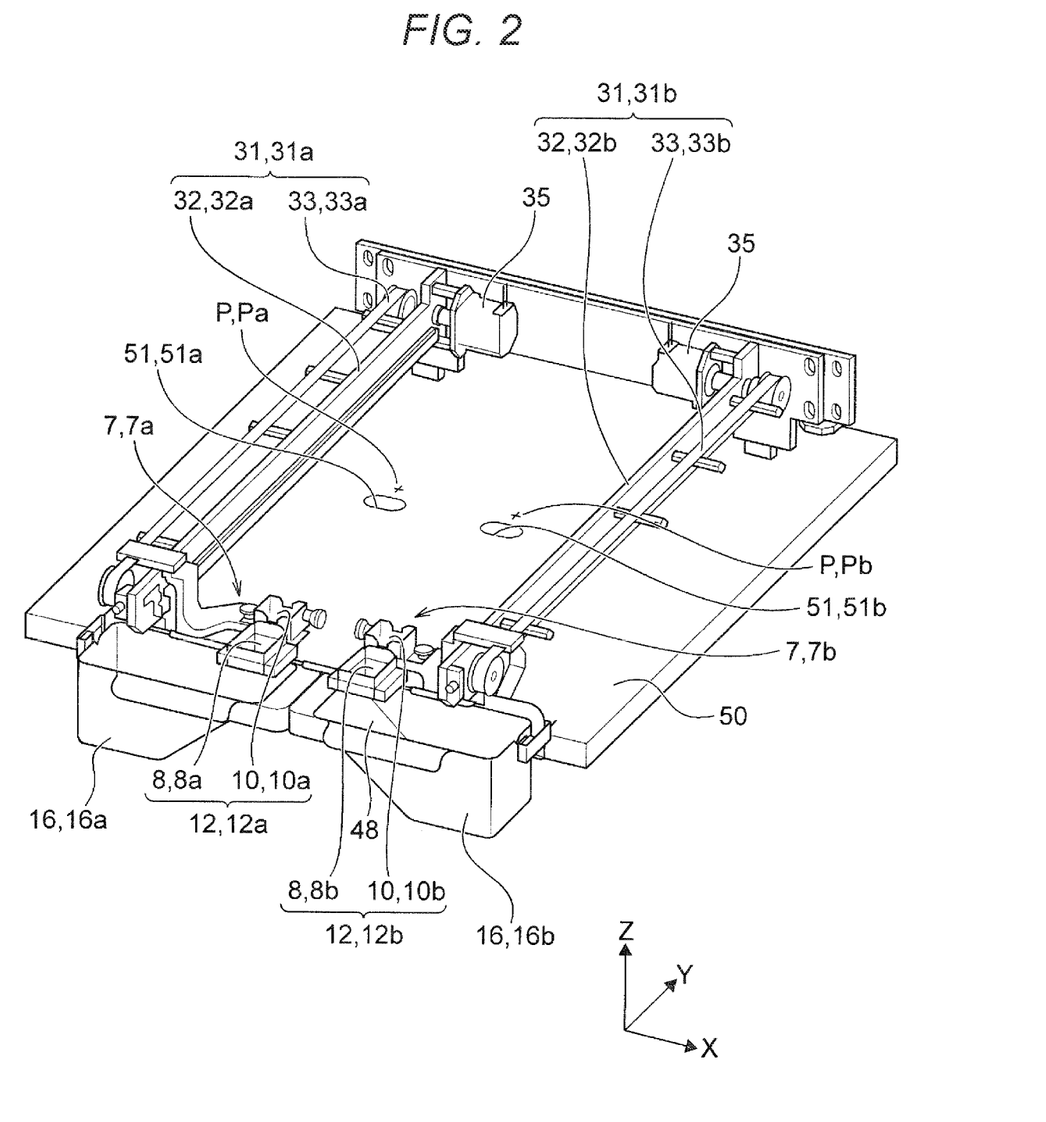
FIG. 2 is a perspective view of a main part according to the first embodiment.

As shown in FIGS. 1 and 2, the three-dimensional shaping device 1 includes the dispensing unit 15 that has a nozzle 18 and dispenses the material 9 toward the stage 5, a cleaning mechanism 7 (FIG. 2) that cleans the nozzle 18, a moving unit 30 that moves the dispensing unit 15 and the cleaning mechanism 7 relative to the stage 5, and the control unit 60 that controls an operation of the moving unit 30.

The cleaning mechanism 7 includes a cleaning unit 12 that includes a purge unit 8, in which the material 9 is purged from the nozzle 18, and a brush unit 10 in contact with the nozzle 18, and a recovery unit 16 that recovers the material 9 accumulated in the purge unit 8. The control unit 60 is configured to move the cleaning unit 12 relative to the stage 5 in conjunction with the movement of the dispensing unit 15 relative to the stage 5.

Figure 8:
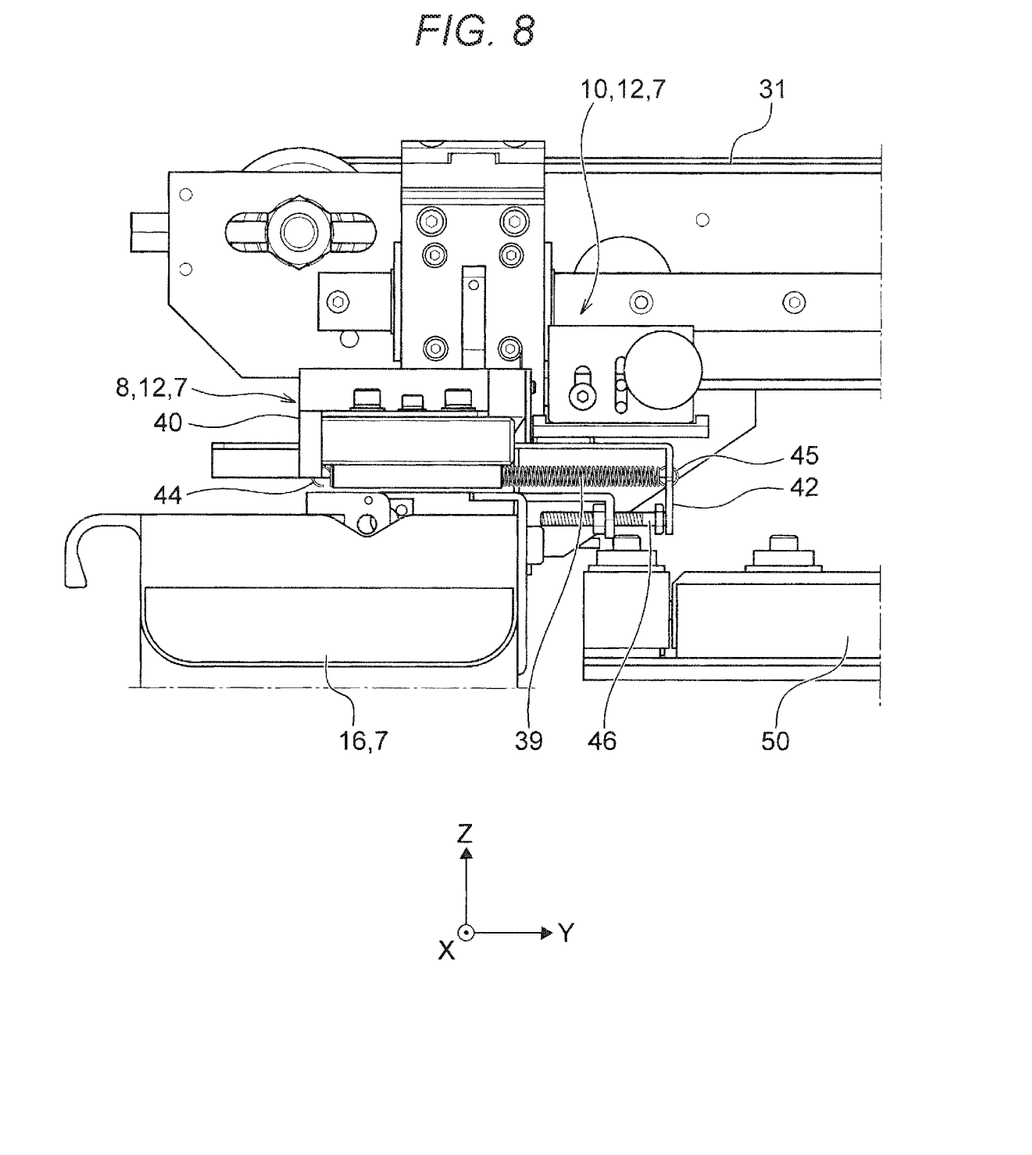
FIG. 8 is an enlarged front view of a main part of the cleaning mechanism according to the first embodiment.

As shown in FIG. 2, in the present embodiment, when the cleaning mechanism 7 cleans the nozzle 18, the cleaning unit 12 moves in the front-rear direction (Y axis direction) of the three-dimensional shaping device 1. The recovery unit 16 is disposed on the front side (−Y direction) in the front-rear direction of the three-dimensional shaping device 1. Here, the recovery unit 16 is attached to the front side (−Y direction) of the heating unit 50 described later (FIGS. 2 and 8).

In the present embodiment, a cleaning moving unit 31 (FIG. 1) that moves the cleaning unit 12 to a cleaning position P is provided. The cleaning moving unit 31 moves the cleaning unit 12 to the cleaning position P in conjunction with the movement of the dispensing unit 15 to the cleaning position P. That is, the cleaning moving unit 31 moves only the cleaning unit 12 of the cleaning mechanism 7 to the cleaning position P.

As shown in FIGS. 1 and 2, in the present embodiment, a heating unit 50 that heats a shaping region 22 of the stage 5 is provided. The heating unit 50 is located above a position of the dispensing port 6 of the nozzle 18 and below the cleaning unit 12 during shaping. The heating unit 50 has a shape that covers the shaping region when viewed from the direction (Z axis direction) perpendicular to the stage 5.

The moving unit 30 is configured to move the heating unit 50 relative to the stage 5 in conjunction with the movement of the dispensing unit 15 relative to the stage 5.

As shown in FIG. 2, in the present embodiment, the cleaning unit 12 includes a first cleaning unit 12a corresponding to the first dispensing unit 15a and a second cleaning unit 12b corresponding to the second dispensing unit 15b. The recovery unit 16 further includes a first recovery unit 16a corresponding to the first cleaning unit 12a and a second recovery unit 16b corresponding to the second cleaning unit 12b.

Moving Unit

The operation of the moving unit 30 is controlled by the control unit 60.

As shown in FIGS. 1 and 2, the moving unit 30 moves the dispensing unit 15, the cleaning mechanism 7, and the heating unit 50 relative to the stage 5. Here, the moving unit 30 moves the stage 5 in the X axis direction and the Y axis direction to change relative positions of the dispensing unit 15, the cleaning mechanism 7, the heating unit 50, and the stage 5 in the X axis direction and the Y axis direction. In addition, the moving unit 30 moves the cleaning unit 12 and the heating unit 50 relative to the stage 5 in conjunction with the movement of the dispensing unit 15 relative to the stage 5 in the X axis direction and the Y axis direction.

The moving unit 30 moves the dispensing unit 15 in the Z axis direction. By the movement in the Z axis direction, the relative positions of the dispensing unit 15 and the stage 5 in the Z axis direction are changed. The moving unit 30 is configured to move the cleaning unit 12 relative to the stage 5 in conjunction with the movement of the dispensing unit 15 relative to the stage 5.

In the moving unit 30, an electric actuator is used as a drive mechanism. It is needless to say that the drive mechanism of the moving unit 30 is not limited thereto, and may be any mechanism as long as the moving unit 30 can move an object to be moved, such as the dispensing unit 15, in the respective directions by a drive force of a drive source.

Cleaning Moving Unit

The operation of the cleaning moving unit 31 is also controlled by the control unit 60.

As shown in FIG. 2, the cleaning moving unit 31 moves the cleaning unit 12 to the cleaning position P. That is, in the present embodiment, the movement of the cleaning unit 12 relative to the stage 5 by the moving unit 30 is performed by the cleaning moving unit 31.

In the present embodiment, the cleaning moving unit 31 includes a guide frame 32 and a drive belt 33 extending in the front-rear direction. The cleaning unit 12 is guided by the guide frame 32 and moved in the front-rear direction by the drive belt 33. In FIG. 2, reference numeral 35 denotes a motor as a drive source of the drive belt 33.

When cleansing the nozzle 18, the moving unit 30 moves the dispensing unit 15 to the cleaning position P, and the cleaning moving unit 31 moves the cleaning unit 12 in the front-rear direction and moves the cleaning unit 12 to the cleaning position P in conjunction with the movement of the dispensing unit 15.

Heating Unit

As shown in FIG. 1, the heating unit 50 heats the shaping region 22 of the stage 5. In the shaping region 22, a layer formed by the material 9 dispensed from the nozzle 16 is formed at the stage 5. The layer is heated by the heating unit 50. When the material 9 is dispensed toward the first layer formed in the shaping region to form the second layer, the heating unit 50 is provided for the purpose of improving the adhesion between the first layer and the second layer. For the above purpose, a shape of the heating unit 50 has, for example, a substantially plate shape. The heating unit 50 includes a heater. The heating unit 50 has a shape covering the shaping region 22 when viewed from the Z axis direction. The shaping region 22 overlaps the heating unit 50 when viewed from the Z axis direction. An area of the heating unit 50 is larger than an area of the shaping region 22 when viewed from the Z axis direction.

As shown in FIGS. 1 and 2, the heating unit 50 is located above the dispensing port 6 of the nozzle 18 (FIG. 1) and below the cleaning mechanism 7 (FIG. 2) during shaping in which the three-dimensional shaping device 1 shapes a shaped object. In the illustrated example, the "above" is the +Z axis direction, and the "below" is the −Z axis direction.

As shown in FIG. 2, the heating unit 50 is provided with a through hole 51 whose penetrating direction is an upper-lower direction (Z axis direction).

Shaping

As shown in FIG. 1, when shaping is performed by the dispensing unit 15b, a nozzle 18b of the dispensing unit 15b is moved downward by the moving unit 30 to be located in a through hole 51b, and a dispensing port 6b is located below the heating unit 50. In this state, a material 9b is dispensed from the dispensing port 6b of the nozzle 18b to the stage 5 to perform shaping.

In the present embodiment, the moving unit 30 moves the stage 5 in the X axis direction and the Y axis direction to dispense a first layer. When the dispensing operation of the first layer is completed, the moving unit 30 moves the dispensing unit 15 and the heating unit 50 in the Z axis direction by a distance corresponding to one layer. Subsequently, a dispensing operation of a second layer is performed. The above dispensing operations are repeated to perform shaping.

Cleaning

In the present embodiment, while shaping is performed by the dispensing unit 15b, a nozzle 18a of the other dispensing unit 15a is cleaned.

When cleaning the nozzle 18a, as shown in FIG. 1, the moving unit 30 moves the dispensing unit 15a upward and positions the dispensing unit 15a at the cleaning position P above a through hole 51a. In conjunction with the movement of the dispensing unit 15a toward a cleaning position Pa, a cleaning moving unit 31a moves the cleaning unit 12a toward the cleaning position Pa in a direction along a guide frame 32a. After the nozzle 18a reaches the cleaning position Pa, the cleaning unit 12a is controlled to reach the cleaning position Pa.

Figure 5:
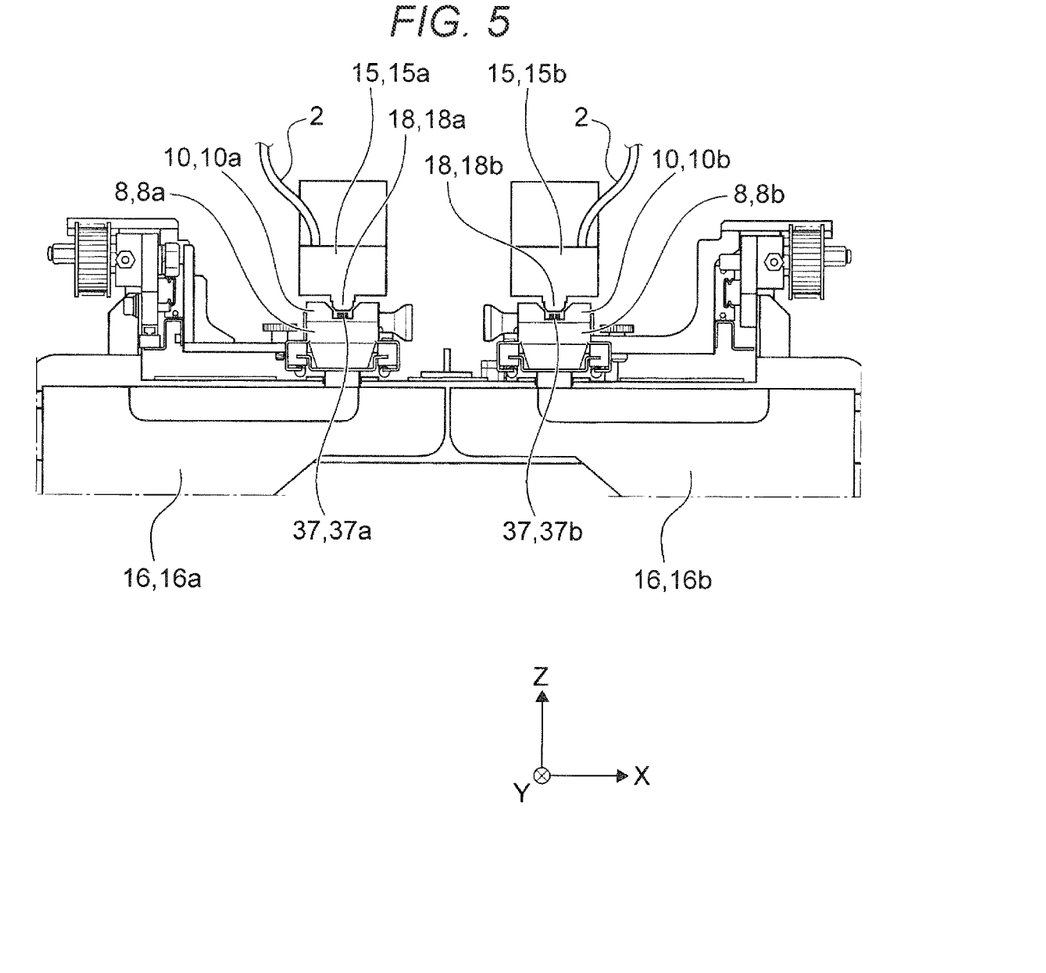
FIG. 5 is an enlarged front view of a main part according to the first embodiment.

Then, as shown in FIG. 5, when the cleaning unit 12a reaches the cleaning position Pa, the cleaning moving unit 31a reciprocates the cleaning unit 12a back and forth (Y axis direction) with a small stroke. By the reciprocating movement, a brush unit 10a brushes and cleans a dispensing port 6a of the nozzle 18a.

In addition to the cleaning performed by the brush unit 10a, a purge unit 8a is moved to a position below the dispensing port 6a of the nozzle 18a, and the material 9a is purged from the dispensing port 6a into the purge unit 8a to clean the inside of the nozzle 18a.

Brush Unit

Figure 3:
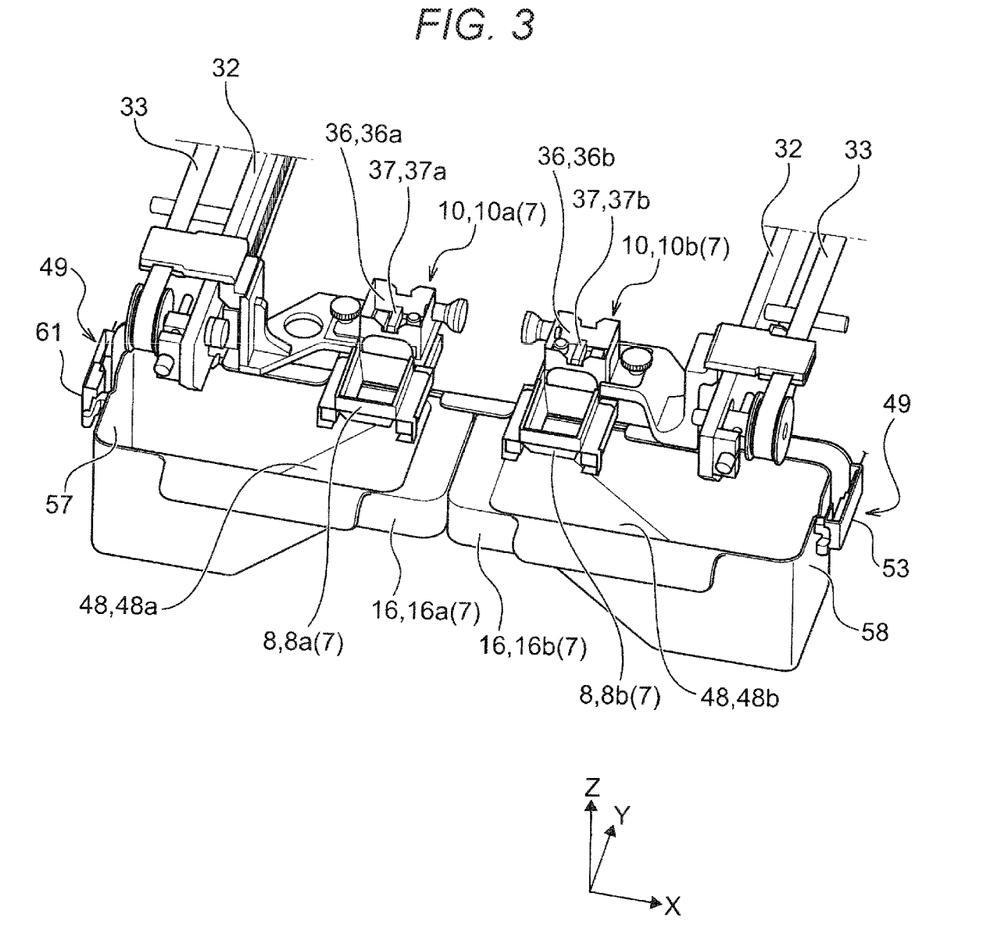
FIG. 3 is an enlarged perspective view of a main part according to the first embodiment.
Figure 4:
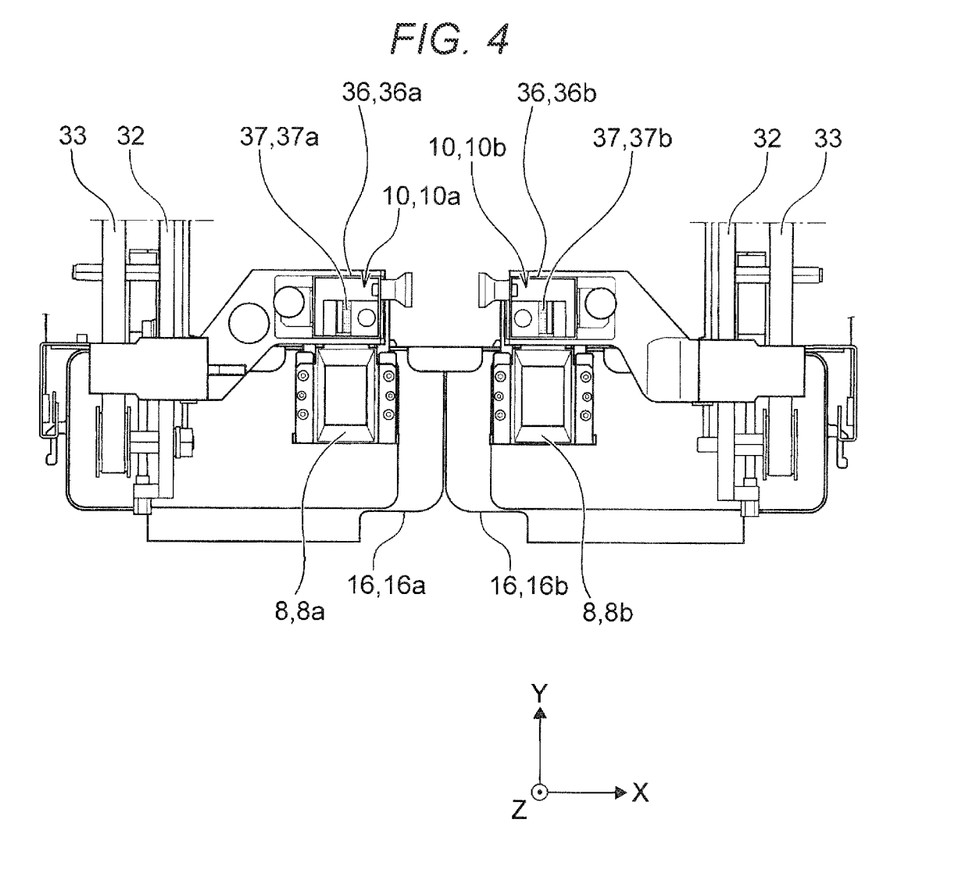
FIG. 4 is an enlarged plan view of a main part according to the first embodiment.

As shown in FIGS. 3, 4, and 5, the brush unit 10 includes a cleaning box 36 and a brush 37 fixed in the cleaning box 36.

As shown in FIG. 5, at the cleaning position P, the brush 37 comes into contact with the dispensing port 6 of the nozzle 18 to perform brushing, that is, cleaning. Dirt generated by the cleaning is accumulated in the cleaning box 36.

Purge Unit and Bottom Surface

The purge unit 8 receives the material 9 purged from the nozzle 18.

Figure 7:
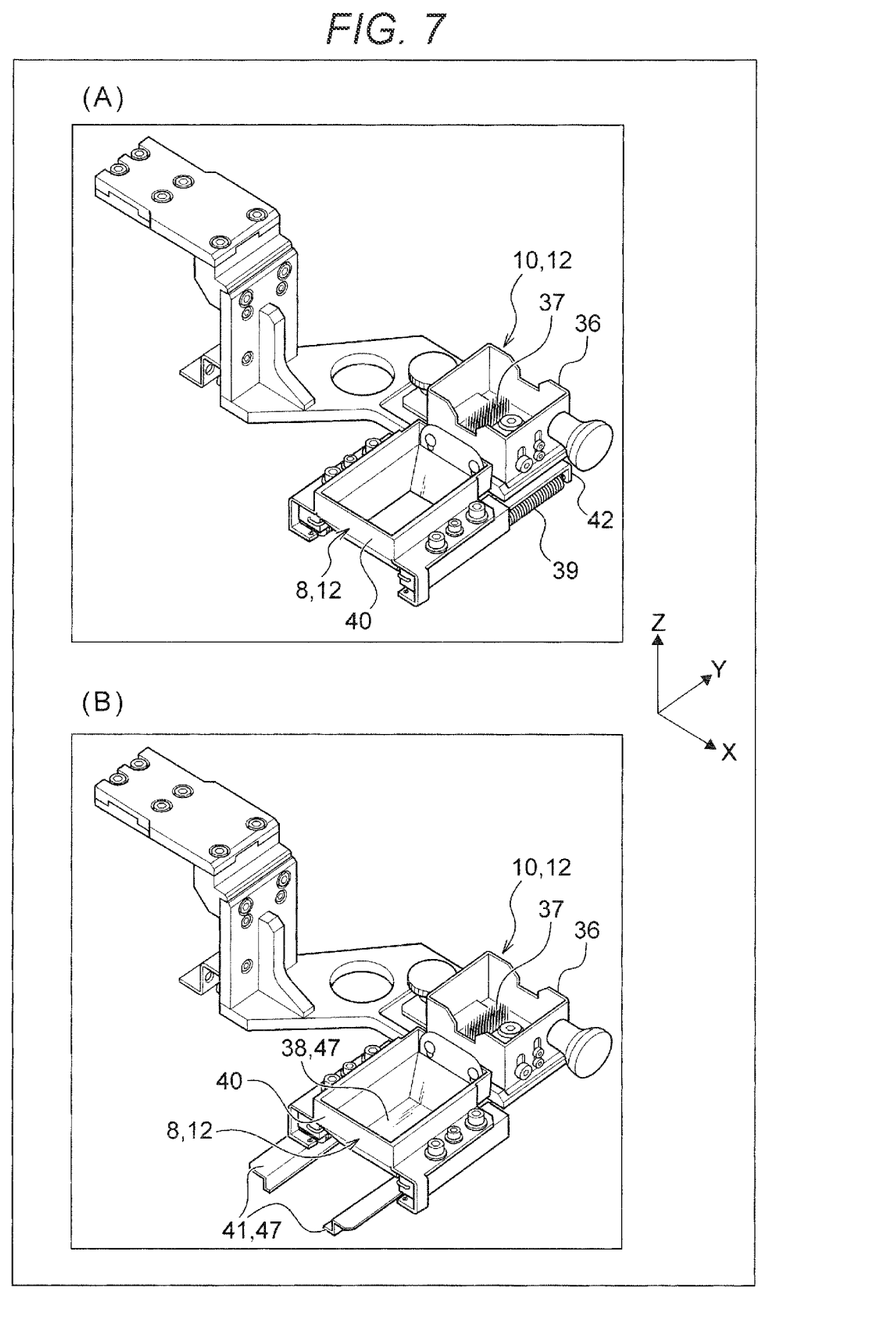
FIG. 7 is an enlarged perspective view of a cleaning mechanism according to the first embodiment.

As shown in FIG. 7, the purge unit 8 has an openable and closable bottom surface 38 ((B) of FIG. 7). The material 9 accumulated in a case 40 of the purge unit 8 falls into the recovery unit 16 with the bottom surface 38 in an open state ((A) of FIG. 7) (FIG. 8).

In the present embodiment, the bottom surface 38 includes a slide member 47 that slides in a moving direction of the cleaning unit 12, and when the purge unit 8 moves and reaches a recovery position where the material 9 in the purge unit 8 falls into the recovery unit 16, the slide member 47 slides to bring the bottom surface 38 into the open state.

Specifically, (A) of FIG. 7 shows a state in which the bottom surface 38 is open. The slide member 47 is provided at a position constituting the bottom surface 38 of the case 40 and is slidable in the front-rear direction (Y axis direction). The slide member 47 is pulled in the front direction (−Y direction) by a spring 39. As shown in FIG. 8, one end 44 of the spring 39 is locked at a position on the front side (−Y direction) of the case 40, and the other end 45 is locked at a locking piece 42 located at a position on the rear side (+Y direction) of the slide member 47.

As shown in (B) of FIG. 7, the slide member 47 is always pulled in the −Y direction by the spring 39, and the bottom surface 38 is in a closed state. Reference numeral 41 denotes a side slide formed integrally with the slide member 47.

When the cleaning unit 12 moves toward the recovery unit 16 on the front side (−Y direction), the locking piece 42 is locked to a locked portion 46 (FIG. 8) fixed to the recovery unit 16 side at a position before reaching the recovery unit 16. This locking restricts movement of the locking piece 42. In this state, the movement of the slide member 47 is restricted, but the case 40 of the purge unit 8 can be moved. When the case 40 moves and reaches a position above the recovery unit 10, that is, the recovery position, the movement of the cleaning unit 12 is stopped. In this state, as shown in (B) of FIG. 7 and FIG. 8, the slide member 47 slides and the bottom surface 38 turns into the open state. Accordingly, the material 9 accumulated in the case 40 falls into the recovery unit 16. When the case 40 moves away from the recovery position, the slide member 47 is pulled in the −Y direction by the spring 39, and the bottom surface 38 returns to the closed state.

Recovery Unit

In the present embodiment, the recovery unit 16 is detachably provided. That is, the recovery unit 16 is detachably provided at a position which is on the front side of the heating unit 50 and constitutes the recovery position.

In addition, as shown in FIG. 3, the recovery unit 16 has an inclined surface 48 inclined in the horizontal direction on the inner surface thereof. The inclined surface 48 is provided so as to descend toward the lowest portion in the recovery unit 16.

In the present embodiment, as shown in FIG. 3, a detection unit 49 that detects the amount of the material 9 recovered by the recovery unit 16 is provided.

The detection unit 49 includes a light emitting unit 61 and a light receiving unit 53 located at an optical path 52 of the light emitting unit 61. The amount of the material 9 recovered by the recovery unit 16 is detected based on whether light emitted from the light emitting unit 61 enters the light receiving unit 53 or does not enter the light receiving unit 53.

When the amount of the material 9 recovered by the recovery unit 16 increases, the light emitted from the light emitting unit 61 is blocked by an upper surface portion of the material 9 and does not enter the light receiving unit 53. By this detection, a user can know that the recovery unit 16 is full of the material.

Figure 6:
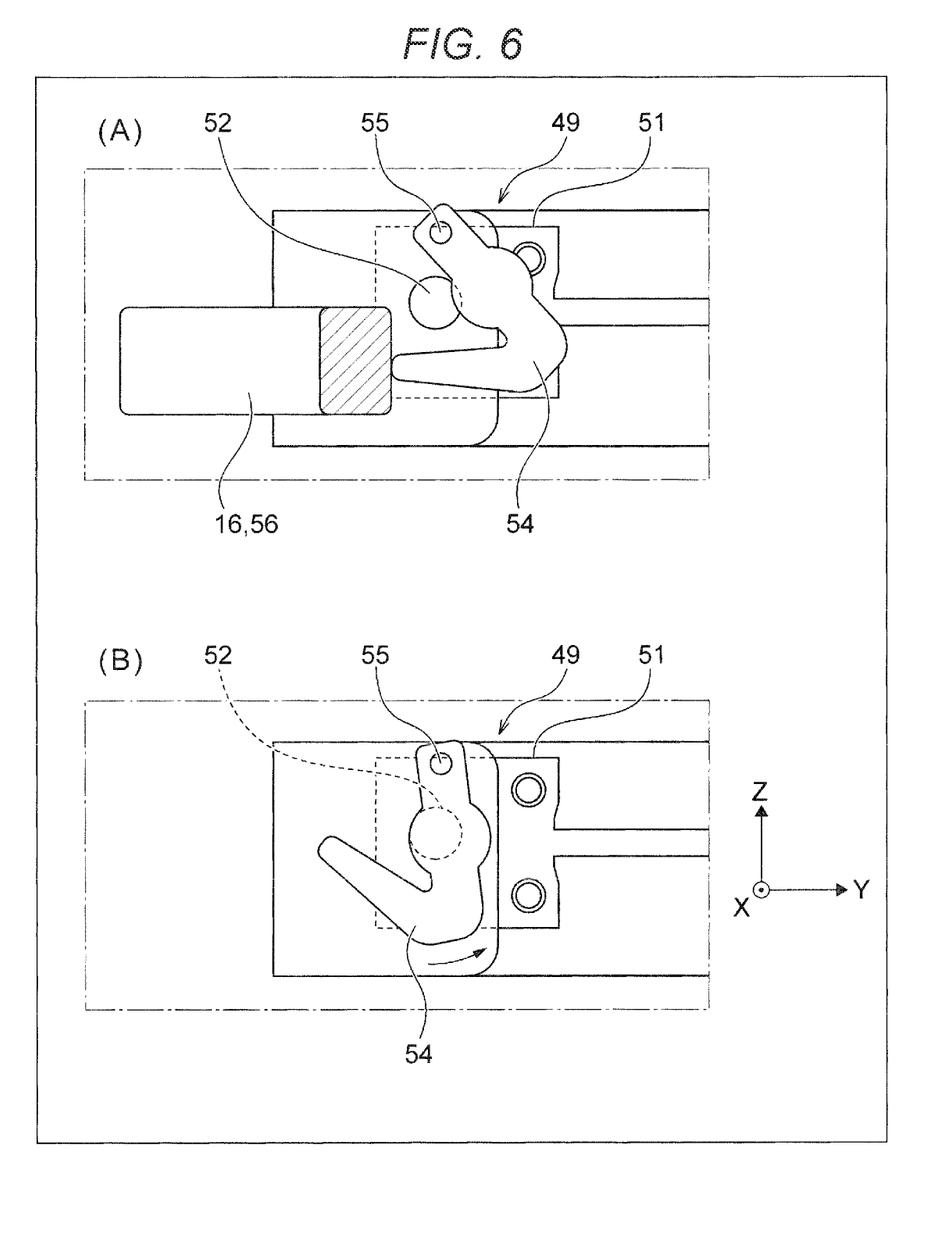
FIG. 6 is an enlarged side view of a main part of a detection unit according to the first embodiment.

In the present embodiment, as shown in FIG. 6, the detection unit 49 further includes an optical path opening and closing mechanism 54 that switches between opening and closing of the optical path 52 in a state in which the recovery unit 16 is not attached and in a state in which the recovery unit 16 is attached. Specifically, the optical path opening and closing mechanism 54 has a structure in which a free end pivots with one end as a pivot fulcrum 55.

When the recovery unit 16 is attached, a protruding piece 56 on the recovery unit 16 side acts on the optical path opening and closing mechanism 54 and pivots the optical path opening and closing mechanism 54 to open the optical path 52. Accordingly, the user can know that the recovery unit 16 is attached.

When the recovery unit 16 is detached from the attached state, the optical path opening and closing mechanism 54 is pivoted by its own weight to close the optical path 52. Accordingly, the user can know that the recovery unit 16 is not attached.

The light emitting unit 61 and the light receiving unit 53 of the detection unit 49 may be used only for the purpose of detecting whether the recovery unit 16 is attached. Furthermore, when the light emitting unit 61 and the light receiving unit 53 of the detection unit 49 are used only for the purpose of detecting whether the recovery unit 16 is attached, by the action of the optical path opening and closing mechanism 54, the optical path 52 may be in a closed state when the recovery unit 16 is attached, and the optical path 52 may be in an open state when the recovery unit 16 is detached from the attached state. Accordingly, the user can also know whether the recovery unit 16 is attached.

In the present embodiment, as shown in FIG. 3, the first recovery unit 16a and the second recovery unit 16b are disposed adjacent to each other in the horizontal direction. The detection unit 49 is configured to detect an amount of a material recovered by the first recovery unit 16a and the second recovery unit 16b by emitting light from a side surface 57 of the first recovery unit 16a and receiving light at a side surface 58 of the second recovery unit 16b. That is, the amount of the material recovered by the first recovery unit 16a and the second recovery unit 16b can be detected by one detection unit 49.

When one of the first recovery unit 16a and the second recovery unit 16b is in a state of shielding the light, the user can know that the recovery unit 16 is full of the material.

When the detection unit 49 detects that one of the recovery units 16 is full, the user is notified by light, sound, or the like. The user removes the accumulated recovered matter by removing the full recovery unit 16, and then attaches the recovery unit 16 to the original position.

DESCRIPTION OF EFFECTS OF FIRST EMBODIMENT (1) According to the three-dimensional shaping device of the present embodiment, the moving unit 30 is configured to move the cleaning unit 12 relative to the stage 5 in conjunction with the movement of the dispensing unit 15 relative to the stage 5. Accordingly, when the nozzle 18 is cleaned, an access of the dispensing unit 15 to the cleaning unit 12 can be made shorter than that in a structure in which the conjunction is not performed.

In addition, since the cleaning mechanism 7 includes the cleaning unit 12 and the recovery unit 16, the cleaning mechanism 7 can be made compact.

(2) In addition, according to the present embodiment, the recovery unit 16 is disposed on the front side in the front-rear direction, which is a moving direction during cleaning. Accordingly, it is easy to process the matter accumulated in the recovery unit 16 when the recovery unit 16 is full.

(3) In addition, according to the present embodiment, the cleaning moving unit 31 moves the cleaning unit 12 to the cleaning position P. Accordingly, the structure is simpler than when only the dispensing unit 15 is moved to the cleaning position P. In addition, the control is also simplified.

In addition, when cleaning the nozzle 18, the cleaning unit 12 is moved in conjunction with the movement of the dispensing unit 15 to the cleaning position P, and therefore, a time until the cleaning can be started at the cleaning position P can be shortened as compared with that in the structure in which the conjunction is not performed.

(4) In addition, according to the present embodiment, since the purge unit 8 has the openable and closable bottom surface 38, the material 9 accumulated in the purge unit 8 can fall into the recovery unit 16 with the bottom surface 38 in the open state. Accordingly, the material 9 accumulated in the purge unit 8 can be transferred to the recovery unit 16 using a simple structure.

(5) In addition, according to the present embodiment, since the bottom surface 38 has the slide member 47 by which the bottom surface 38 slides, when the purge unit 8 moves and reaches a recovery position where the material 9 in the purge unit 8 falls into the recovery unit 16, the slide member 47 can automatically slide to bring the bottom surface 38 into the open state. Accordingly, the material 9 accumulated in the purge unit 8 can be easily transferred to the recovery unit 16 only by sliding the slide member 47.

(6) In addition, according to the present embodiment, since the recovery unit 16 has the inclined surface 48 inclined in the horizontal direction on the inner surface, an object dropped from the inside of the purge unit 8 into the recovery unit 16 is guided by the inclined surface 48 and gradually accumulates from a low position. Accordingly, the object can be uniformly accumulated in the recovery unit 16.

(7) In addition, according to the present embodiment, the moving unit 30 is configured to move the heating unit 50 relative to the stage 5 in conjunction with the movement of the dispensing unit 15 relative to the stage 5. Accordingly, it is possible to maintain a state in which the adhesion between the layers made of the material 9 formed in the shaping region 22 is increased.

(8) In addition, according to the present embodiment, when performing the cleaning, the moving unit 30 moves the dispensing port 6 of the nozzle 18 to a position above the heating unit 50. Accordingly, the cleaning unit 12 can clean the nozzle 18.

(9) In addition, according to the present embodiment, since the detection unit 49 detects the amount of the material 9 recovered by the recovery unit 16, it is possible to grasp an accumulation state of the material 9 accumulated in the recovery unit 16, and thus it is possible to avoid overflow of the material 9 accumulated in the recovery unit 16.

(10) In addition, according to the present embodiment, the detection unit 49 includes the optical path opening and closing mechanism 54 that switches between opening and closing of the optical path 52 in a state in which the recovery unit 16 is not attached and in a state in which the recovery unit 16 is attached. With the optical path opening and closing mechanism 54, it is possible to distinguish between the state in which the recovery unit 16 is not attached to an attachment position and the state in which the recovery unit 16 is attached to the attachment position. Accordingly, it is possible to easily grasp whether the recovery unit 16 is attached.

(11) In addition, according to the present embodiment, the dispensing unit 15 includes the first dispensing unit 15a and the second dispensing unit 15b. Accordingly, the cleaning unit 12 can, during shaping by one of the first dispensing unit 15a and the second dispensing unit 15b, clean the nozzle 18 of the other one of the first dispensing unit 15a and the second dispensing unit 15b. Therefore, a dispensing operation of the material 9 onto the stage 5 for shaping and a cleaning operation of the nozzle 18 can be efficiently performed.

(12) In addition, according to the present embodiment, the cleaning mechanism 7 includes the first cleaning unit 12a corresponding to the first dispensing unit 15a and the second cleaning unit 12b corresponding to the second dispensing unit 15b, and further includes the first recovery unit 16a corresponding to the first cleaning unit 12a and the second recovery unit 16b corresponding to the second cleaning unit 12b. Accordingly, the cleaning of the first dispensing unit 15a and the recovery of the material 9 from the first cleaning unit 12a to the first recovery unit 16a, and the cleaning of the second dispensing unit 15b and the recovery of the material 9 from the second cleaning unit 12b to the second recovery unit 16b can be performed separately, which is efficient.

(13) In addition, according to the present embodiment, the detection unit 49 detects the amount of the material 9 recovered by the first recovery unit 16a and the second recovery unit 16b by emitting light from the side surface 57 of the first recovery unit 16a and receiving light at the side surface 58 of the second recovery unit 16b disposed adjacent to the first recovery unit 16a in the horizontal direction. Accordingly, the amount of the material 9 accumulated in the first recovery unit 16a and the second recovery unit 16b can be grasped by one detection unit 49 without using two detection units.

Other Embodiments

The three-dimensional shaping device 1 according to the present disclosure is based on the configuration of the embodiment described above, and it is needless to say that the partial configuration can be changed or omitted without departing from the gist of the present disclosure.

For example, the bottom surface 38 of the purge unit 8 may be opened and closed by pivoting like a door without using the slide member 47.

In addition, the detection unit 49 may be configured to be individually provided for each recovery unit 16.

The recovery unit 16 may have a planar structure without the inclined surface 48.

What is claimed is:

1. A three-dimensional shaping device comprising:
    a dispensing head having a nozzle and configured to dispense a material toward a stage;
    a cleaning mechanism having a brush, the cleaning mechanism being configured to clean a tip of the nozzle by causing the brush to contact the tip of the nozzle due to reciprocating movement of the brush relative to the nozzle;
    a motor configured to move the dispensing-head and the cleaning mechanism relative to the stage; and
    a controller configured to control an operation of the motor, wherein
    the cleaning mechanism further includes:
        a purge tray in which the material-is purged from the nozzle is received; and
        a recovery container configured to recover the material accumulated in the purge tray, and
        the controller is configured to move the brush and the purge tray relative to the stage in conjunction with movement of the dispensing head relative to the stage.

2. The three-dimensional shaping device according to claim 1, further comprising:
    a cleaning motor configured to move the brush and the purge tray in a front-rear direction to clean the nozzle, wherein
    the recovery container is disposed on a front side in the front-rear direction.

3. The three-dimensional shaping device according to claim 2, wherein
    the cleaning motor is configured to move the brush and the purge tray to a cleaning position in conjunction with the movement of the dispensing head to the cleaning position.

4. The three-dimensional shaping device according to claim 1, wherein
    the purge tray has an openable and closable bottom surface, and
    the material accumulated in the purge tray falls into the recovery container when the bottom surface is open.

5. The three-dimensional shaping device according to claim 4, wherein
    the bottom surface includes a slide member configured to slide, and
    when the purge tray moves to a recovery position where the material in the purge tray falls into the recovery container, the slide member slides to open the bottom surface.

6. The three-dimensional shaping device according to claim 1, wherein
    the recovery container has an inclined surface inclined in a horizontal direction on an inner surface of the recovery container.

7. The three-dimensional shaping device according to claim 1, further comprising:
    a heater configured to heat a shaping region of the stage, wherein
    heater
        is located above a position of a dispensing port of the nozzle and below the brush and the purge tray during shaping, and
        has a shape that covers the shaping region when viewed from a direction perpendicular to the stage, and
    the motor is configured to move heater relative to the stage in conjunction with the movement of the dispensing head relative to the stage.

8. The three-dimensional shaping device according to claim 7, wherein
    the motor is configured to move the dispensing port of the nozzle to a position above heater when the brush cleans the nozzle.

9. The three-dimensional shaping device according to claim 1, further comprising:
    a detector configured to detect an amount of the material recovered by the recovery container.

10. The three-dimensional shaping device according to claim 1, wherein
    the recovery container is detachable,
    the three-dimensional shaping device further includes a detector configured to detect whether the recovery container is attached,
    the detector includes
        a light emitter,
        a light receiver located in an optical path of the light emitter, and
        an optical path opening and closing mechanism configured to open or block the optical path as an open state and a block state, and
    the detector is configured to detect that the recovery container is attached by switching from one of the open state and the block state to the other of the open state and the block state.

11. The three-dimensional shaping device according to claim 1, wherein
    the dispensing head includes a first dispensing head and a second dispensing head, and
    the brush is configured to, during shaping by one of the first dispensing head and the second dispensing head, clean a nozzle of the other of the first dispensing head and the second dispensing head.

12. The three-dimensional shaping device according to claim 1, wherein
    the dispensing head includes a first dispensing head and a second dispensing head,
    the brush includes
        a first brush corresponding to the first dispensing head, and
        a second brush corresponding to the second dispensing head, and
    the recovery container includes
        a first recovery container corresponding to the first brush, and
        a second recovery container corresponding to the second brush.

13. The three-dimensional shaping device according to claim 12, wherein
    the first recovery container and the second recovery container are disposed adjacent to each other in a horizontal direction, and
    the detector is configured to detect an amount of the material recovered by the first recovery container and the second recovery container by emitting light from a side surface of the first recovery container and receiving light at a side surface of the second recovery container.

* * * * *